(12) United States Patent
Courtemanche

(10) Patent No.: US 7,121,483 B2
(45) Date of Patent: Oct. 17, 2006

(54) LIQUID MANURE SPREADING TOOL BAR

(75) Inventor: Alain Courtemanche, Drummondville (CA)

(73) Assignee: J. Houle & Fils Inc., Drummondville (CA)

( * ) Notice: Subject to any disclaimer, the term of this patent is extended or adjusted under 35 U.S.C. 154(b) by 0 days.

(21) Appl. No.: 10/799,697

(22) Filed: Mar. 15, 2004

(65) Prior Publication Data

US 2005/0199754 A1    Sep. 15, 2005

(51) Int. Cl.
*B05B 3/00* (2006.01)
*B05B 3/18* (2006.01)
*B05B 17/04* (2006.01)

(52) U.S. Cl. .............. 239/730; 239/722; 239/739; 239/742; 239/727; 239/723

(58) Field of Classification Search ............... 137/615; 222/610, 617, 174, 608, 526, 527, 533, 464.5; 239/159, 160, 161, 166, 169, 172, 175, 518, 239/521, 523, 524, 165
See application file for complete search history.

(56) References Cited

U.S. PATENT DOCUMENTS

| | | | |
|---|---|---|---|
| 4,014,271 A | | 3/1977 | Rohlf et al. |
| 4,232,616 A | * | 11/1980 | van der Lely ............... 111/121 |
| 5,348,226 A | * | 9/1994 | Heiniger et al. ................ 239/1 |
| 5,435,493 A | * | 7/1995 | Houle .......................... 239/662 |
| RE37,863 E | * | 10/2002 | Depault ..................... 222/383.2 |
| 6,695,179 B1 | * | 2/2004 | Mandile ................... 222/464.3 |

FOREIGN PATENT DOCUMENTS

| | | | |
|---|---|---|---|
| DE | 19640037 A1 | * | 4/1998 |
| DE | 9816993 | | 11/1999 |
| DE | 19816993 A1 | * | 11/1999 |
| FR | 2563963 A | * | 11/1985 |
| FR | 2563966 | | 11/1985 |
| GB | 2019346 | | 10/1979 |
| GB | 2019346 A | * | 10/1979 |

\* cited by examiner

*Primary Examiner*—David A. Scherbel
*Assistant Examiner*—James S. Hogan
(74) *Attorney, Agent, or Firm*—ROBIC

(57) ABSTRACT

A liquid manure spreading tool bar for use on a manure spreader, wherein the manure spreader has a tank and a pump, and wherein the spreading tool bar has a supporting frame externally mounted onto the tank, a manure distributor mounted onto the supporting frame, a vertically extending telescopic conduit made of a rigid material, and at least one manure discharging pipes connected to a corresponding outlet of the manure distributor. The supporting frame is movable in an up and down position with respect to the tank. Each of the manure discharging pipes is made of a rigid material and is vertically movable together with the frame and the manure distributor. The telescopic conduit has one end connected to the manure distributor while the other end is connected to the pump so as to feed the manure pumped from the tank to the manure distributor. In as much as the telescopic conduit and discharging pipes are not flexible, they cannot break.

11 Claims, 6 Drawing Sheets

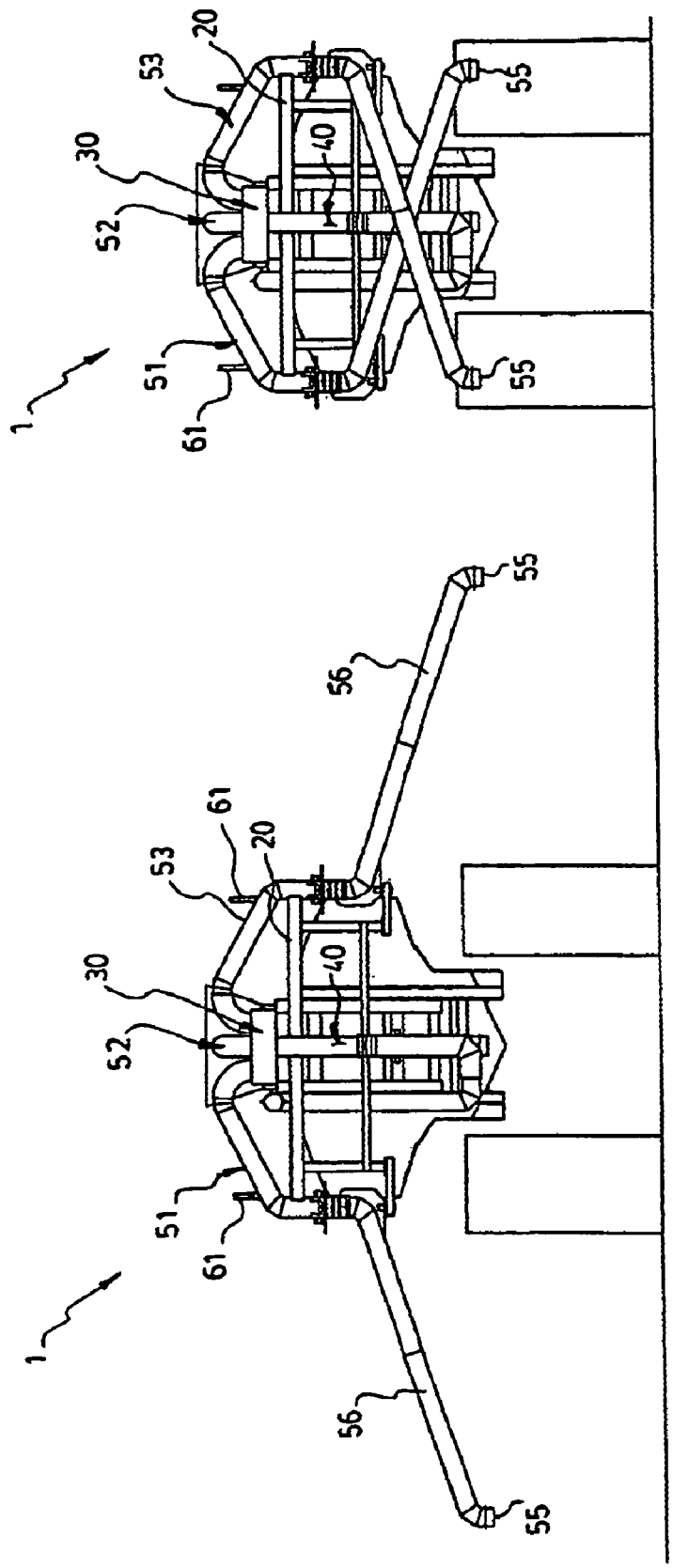

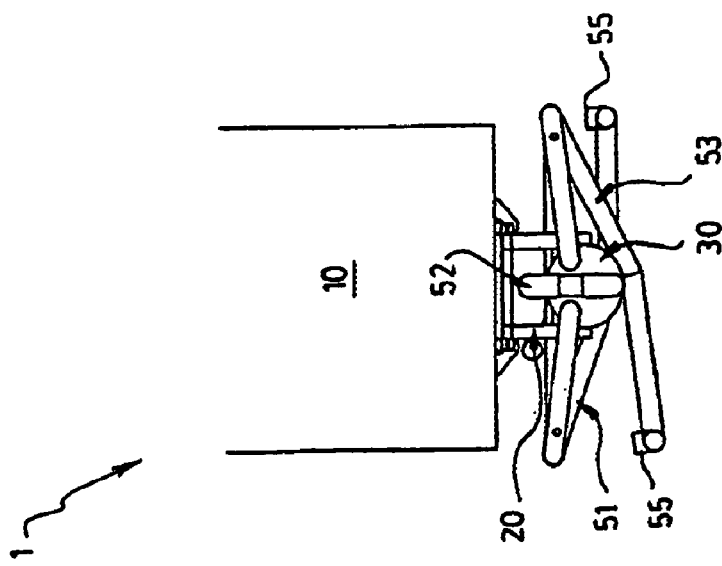
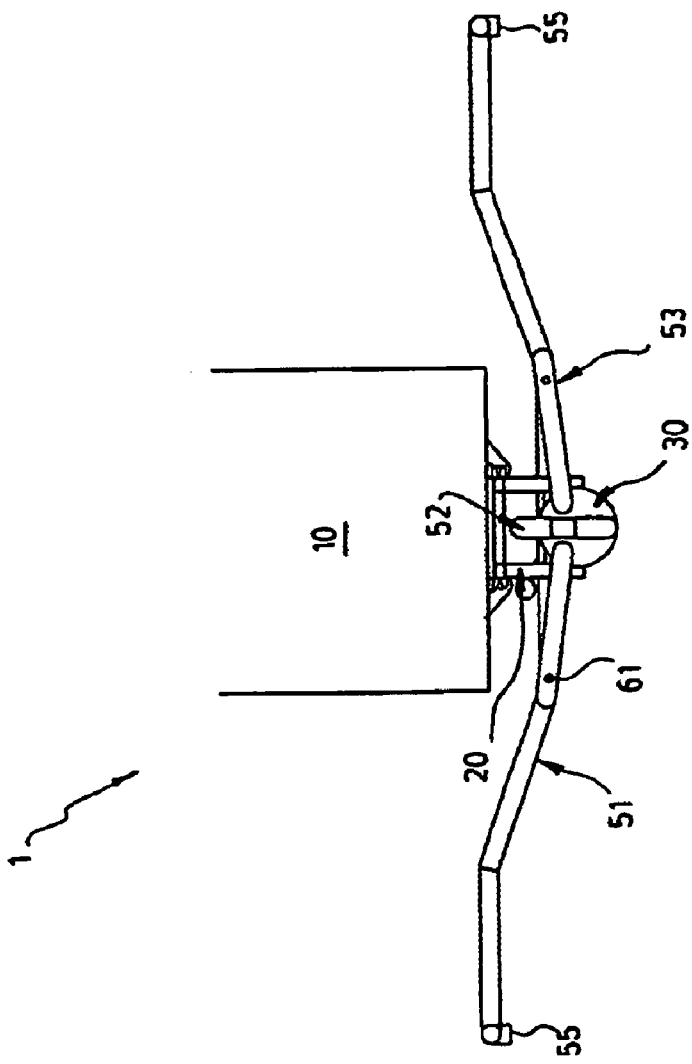
FIG. 6A
FIG. 6B

LIQUID MANURE SPREADING TOOL BAR

FIELD OF THE INVENTION

The present invention relates to a liquid manure spreading tool bar for use in a manure spreader. More precisely, the present invention relates to a spreading tool bar that is built without any small flexible conduits so as to be able to spread all types of liquid manure by gravity.

BRIEF DESCRIPTION OF THE PRIOR ART

U.S. Pat. No. 4,014,271 (Rohlf et al.) issued on Mar. 29th, 1977 discloses an apparatus for distributing liquid manure, which includes a mobile spreader tank that is adapted to contain the liquid manure in the form of slurry and is drawn by a tractor. Connected to the tractor is a transverse frame onto which a series of soil working members and delivery tubes (i.e. discharging hose(s)) are supported thereto. It is worth mentioning that these delivery tubes are positioned behind the working members so as to deliver the manure onto prescribed area and that each tube is connected through a flexible conduit to an outlet in the spreader tank, which is controlled by valve.

U.S. Pat. No. 5,435,493 issued on Jul. 25th, 1995 in the name of the Applicant discloses an improved manure distributor for use in a liquid manure spreader. In this liquid manure spreader, manure is pumped from the manure tank into a distributor that equally distributes the manure to a plurality of discharge hoses. These discharging hoses shown in FIG. 1 identified as "PRIOR ART" are flexible and are connected to both the discharging pipe which itself is connected to the distributor and a tool bar.

German patent application no. DE 198 16 993 A1 (Karsten) discloses a manure spreader tank, in which the liquid manure is pumped through a pipe, which divides itself into two side branches. The outer portions of these side branches are hinged so that they can be swung up and outwards when the vehicle is travelling on roads. Otherwise, the side branches are in an "in use" position. It is worth mentioning that a hydraulic actuating cylinder obtains the upward and downward swinging action. FIG. 2 identified as "PRIOR ART" illustrates this manure spreader.

Thus, most of the liquid manure spreaders and/or tool bars presently available on the market, including those briefly mentioned hereinabove, comprise a system wherein manure is pumped from a reservoir (or tank) and fed via a hose or pipe into a manure distributor from which it is distributed to a plurality of small flexible discharge hoses which usually have their ends fixed in spaced apart positions on a tool bar. The aforementioned discharge hoses are usually made of a flexible material which may be an important source of breakage and/or jamming of liquid manure. The latter phenomena especially occur when the discharge hoses are folded. The flexible discharge hoses are also often constructed with relatively small diameters, thereby forbidding the spreading of thick manure and manure containing bedding. Moreover, most of the above-mentioned liquid manure spreaders and/or spreading tool bars further comprise various means for raising and lowering the tool bar. These raising and lowering means, which may be known to a person skilled in the art, not only moves the flexible discharge hoses but also "act" on other components such as hinges and cylinders which are parts of the spreading tool bar. It is thus considered to be cumbersome to properly fold the flexible hoses to a transporting position. It is also worth mentioning that most of the above-mentioned components are inevitably connected, one way or another, to the manure reservoir.

As aforementioned, a main drawback of most of the presently available liquid manure spreaders and/or spreading tool bars is that they make use of small flexible discharge hoses. Some of them also use a large flexible pipe hose to connect the feeding pump outlet to the tool bar. The problem when use is made of such large flexible hose(s) connected to the pump outlet is that they frequently fold and unfold from a spreading position to a transporting position and such makes them to break often. Thus, the flexible hose(s) have to be repaired in order to efficiently continue spreading manure onto a field.

Another drawback of using liquid manure spreaders and/or spreading tool bars like those known in the prior art or in industry is that the flexible hoses used therein are of small diameter, thereby forbidding the spreading of thick manure and manure containing bedding.

SUMMARY OF THE INVENTION

It has now been discovered that the above mentioned drawbacks may easily be solved when use is made of a liquid manure spreading tool bar equipped with rigid conduits or pipes which are connected between the pump outlet and the manure distributor and between the latter and the discharge pipe(s), thereby avoiding the use of flexible discharging hose(s) which can break when they are folded.

Thus, the object of the present invention is to provide a liquid manure spreading tool bar for use in a manure spreader that can spread different kinds of manure even with beddings in it through at least one discharging pipe(s) consisting of a large diameter rigid conduit(s) or pipe(s), thereby eliminating the use of flexible hose(s) which can frequently break More particularly, the object of the present invention is to provide a liquid manure spreading tool bar for use on a manure spreader comprising:

a tank for transporting manure; and a manure pump having an inlet located within the tank and an outlet located outside said tank to supply the manure stored in the tank to said manner spreading tool bar;

wherein said manner spreading tool bar comprises:

a supporting frame externally mounted onto the tank in such a manner as to be movable up and down with respect to said tank;

means for vertically moving the supporting frame up and down between a low position and a high position relative to the tank;

a manure distributor mounted onto the supporting frame, said manure distributor having an inlet for receiving manure and at least one outlet;

a vertically extending telescopic conduit made of a rigid material, said telescopic conduit having one end connected to the outlet of the pump and another end connected to the inlet of the manure distributor so as to feed the manure pumped from the tank to the manure distributor whatever be the vertical position of the frame relative to the tank; and optionally a manure discharging pipe connected to each of said at least one outlet of the manure distributor, said discharging pipe(s) being made of a rigid material and being vertically movable up and down together with said frame and said manure distributor.

In a particularly preferred embodiment, manure is fed upwardly from the pump through the telescopic conduit and into the manure distributor. Such a preferred embodiment results in a uniform gravity elevation of the manure within the manure distributor, from where it can then be evenly distributed to each of the discharging pipe(s).

In another preferred embodiment, at least one or more of the manure discharging pipes is devised to pivot from a narrow road transportation position to a wide spreading position.

If desired, the discharging pipe(s) of the spreading tool bar allow for the liquid manure to be dropped onto a deflector that can be outfitted with an adjustable sizing outlet to fine tune the spreading pattern width.

The invention and its advantages will be better understood upon reading of the following non-restrictive description of a preferred embodiment thereof made with reference to the accompanying drawings.

BRIEF DESCRIPTION OF THE DRAWINGS

FIGS. 5A and 5B are rear elevational views of the liquid manure spreader shown in FIG. 3, wherein the two external manure discharging pipes are respectively pivoted in an outwardly (5A) and inwardly (5B) position.

FIGS. 6A and 6B are top plan views of the rear portion of the liquid manure spreader shown in FIG. 3, wherein the two external manure discharging pipes are respectively pivoted in an outwardly (6A) and inwardly (6B) position.

DETAILED DESCRIPTION OF THE INVENTION

Figure 1:
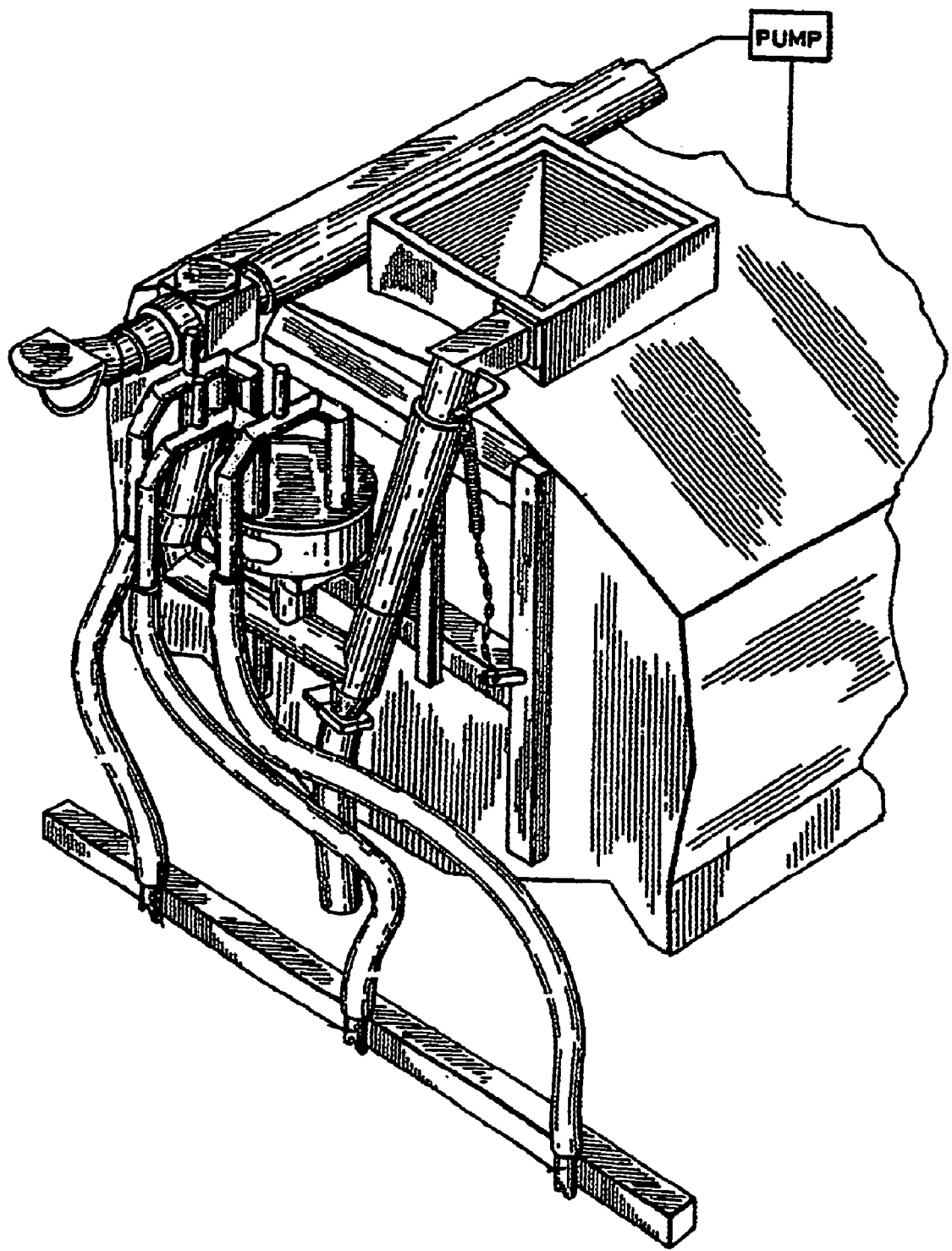
FIG. 1, identified as "PRIOR ART", is a perspective view of part of the rear end of a known liquid manure spreader equipped with a distributor.
Figure 2:
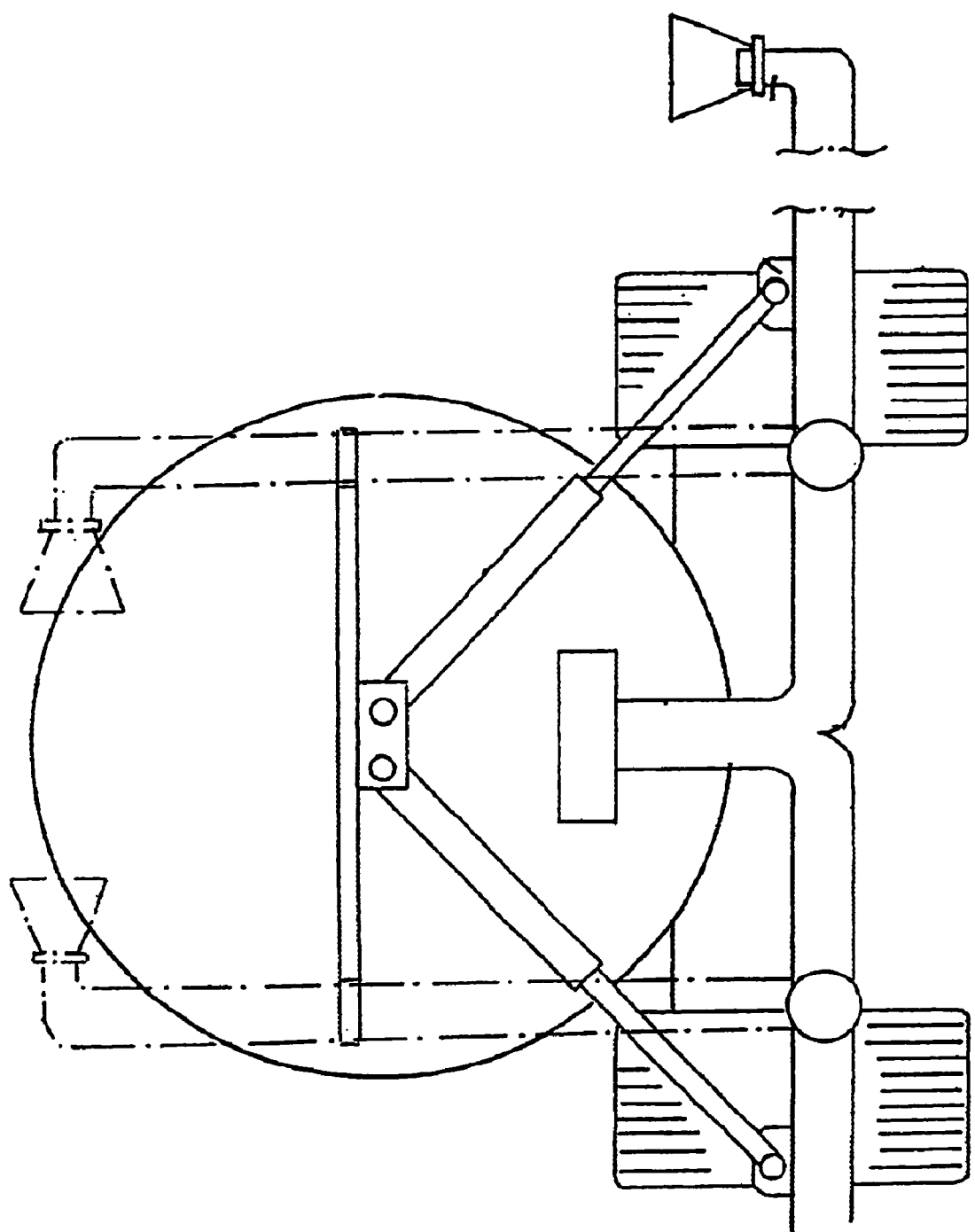
FIG. 2, identified as "PRIOR ART", is a rear elevational view of another known liquid manure spreader.

As aforesaid, the liquid manure spreading tool bar 1 for use in a manure spreader according to a preferred embodiment of the invention as shown in the accompanying drawings is intended to be used for spreading manure via at least one discharge pipes 51 to 53 connected to a manure distributor 30 fed by a vertically extending telescopic conduit 40 connected to a manure pump.

In this connection, even though three discharging pipes 51 to 53 are shown in the drawings, the number of discharging pipes could vary. In other words, the liquid manure spreading tool bar according to the present invention could be operational with only one discharging pipe. However, the use of more than one discharging pipes is advantageous inasmuch as it permits to spread more manure onto the ground in a wide variety of patterns.

Figure 3:
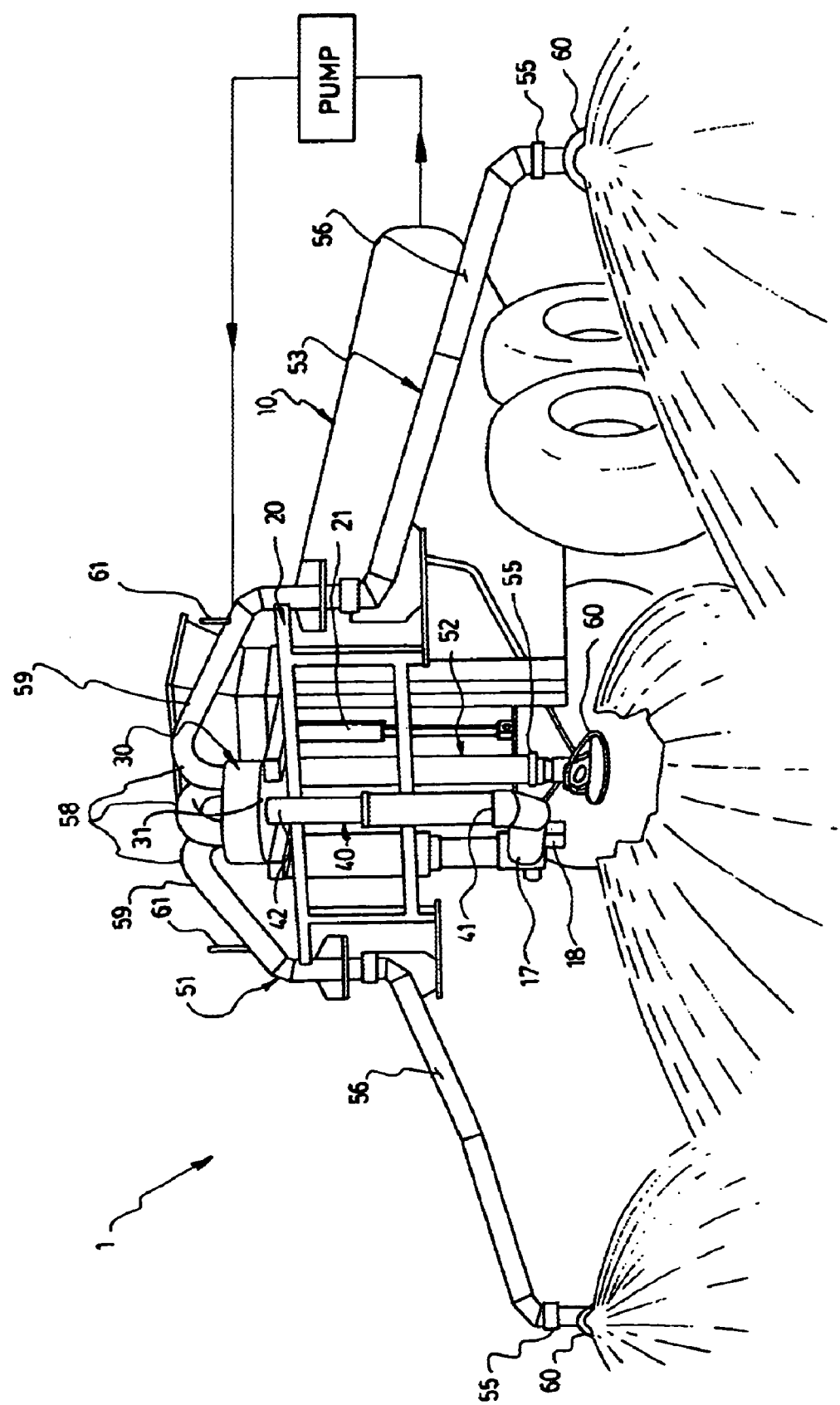
FIG. 3 is a perspective view of a liquid manure spreader according to a preferred embodiment of the present invention.

As shown in FIG. 3, the liquid manure spreading tool bar 1 can be mounted onto a manure spreader which itself comprises a manure tank 10 mounted onto a wheeled chassis operatively hitchable to a farm tractor. The liquid manure spreading tool bar 1 also comprises a supporting frame 20 externally mounted onto the tank of the manure spreader in such a manner as to be movable up and down with respect to said tank. The manure distributor 30 is mounted onto this frame. The manure pump has an inlet located within the manure tank 10 and an outlet pipe 17 connected to the vertically extending telescopic conduit 40. Advantageously, a manually operable valve can be mounted in the outlet pipe 17 to restrict its size and thus adjust the discharge rate of the pump. A manually operable drain 18 (see FIG. 3) may also be mounted at the bottom portion of the outlet pipe 17 of the manure pump to empty this pipe 17 and the telescopic conduit 40 whenever necessary.

The vertically extending telescopic conduit 40 is made of a rigid material. As aforesaid, it has one end 41 connected to the outlet pipe 17 of the pump and another end 42 connected to the inlet 31 of the manure distributor 30. Such allows the manure which is pumped from the tank, to be fed to the distributor whatever the vertical position of the supporting frame 20.

In other words, the end 42 of the vertically extending telescopic conduit 40 is connected to the inlet 31 of the manure distributor 30 while the other end 41 of the telescopic conduit 40 is connected to the outlet pipe 17 of the manure pump.

In practice, depending on the position of the outlet of the pump within the tank, the manure distributor 30 could alternatively be connected to the bottom end of the telescopic conduit 40 while the outlet of the pump would be connected to the top end of the same conduit. Of course, the discharging pipes would then have to be connected to the bottom of the manure distributor which would then be fed from its top.

As is shown (see in particular FIGS. 4A and 4B), the supporting frame 20 is externally mounted onto the tank 10 is such a manner as to be movable up and down with respect to the tank. The manure distributor 30 that is mounted on the supporting frame comprises an inlet 31 for receiving the manure from the vertically extending telescopic conduit 40 and at least one outlet. Of course, the number of outlets corresponds to the number of discharging pipes.

As aforesaid, the manure discharging pipes 51, 52 and 53 are each connected to the outlets of the manure distributor 30. Like the vertically extending telescopic conduit 40, each discharging pipes is made of a rigid material. As shown in FIG. 3, each manure discharging pipes 51 to 53 preferably has a starting portion 58 projecting upwardly on top of the manure distributor 30 and a subsequent portion 59 extending downwardly without any horizontal sections. This particular feature is advantageous since it allows manure to constantly flow by gravity in a downwardly direction even when the pump is stopped, thus avoiding any problem of jamming in the discharging pipes.

Advantageously, an upwardly projecting air vent 61 can be connected to the upper part of each portion 59 in order to prevent unequal vacuuming of the corresponding discharging pipe and to allow it to get empty by gravity as soon as the manure pump is stopped.

As aforesaid, each of the discharging pipes 51 to 53 is also connected to the supporting frame. Such is advantageous in that it allows the discharging pipe(s) 51 to 53 to be vertically moved up and down together with the supporting frame 20 and the manure distributor to adjust the spreading width. A representation of these two positions is shown in FIGS. 4A and 4B.

Preferably, the up and down movement of the supporting frame 20 between a low position and a high position with respect to the tank 10 is obtained by suitable means which preferably consist of a hydraulic system 21. However, other means could be used for vertically moving the supporting frame, such as an electric system or a crank.

Figures 4A, 4B:
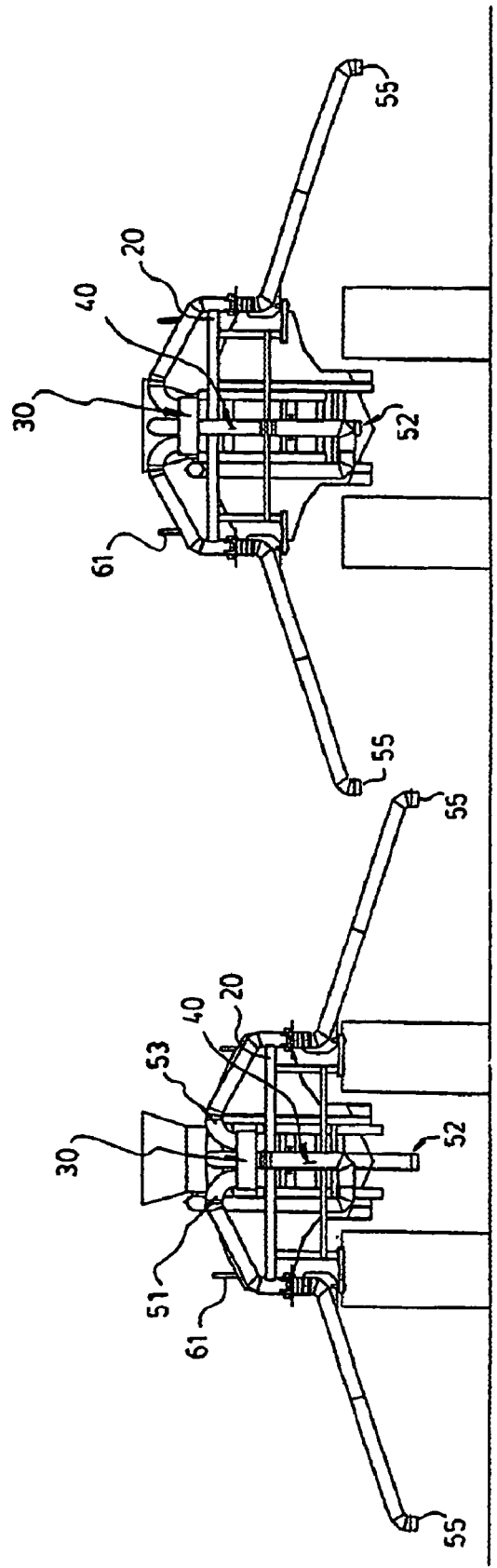
FIGS. 4A and 4B are rear elevational views of the liquid manure spreader shown in FIG. 3, wherein the supporting frame is respectively in a low (4A) and high (4B) position.

When comparing FIGS. 4A and 4B, it becomes apparent that the supporting frame 20 can be lowered or raised, thus affecting the clearance of the discharging pipes with respect to the ground. It also becomes apparent that the difference of height between the low position (4A) and high position (4B) is limited to the length of the vertically extending telescopic conduit 40. Of course, the lowest position is achieved when the vertically extending telescopic conduit 40 has not been extended at all (i.e. the compacted form), and highest position (see FIG. 4B) is achieved when the vertically extending telescopic conduit 40 has been fully extended. Of course, intermediate positions (i.e. when the vertically extending telescopic conduit has not been fully extended) can also be achieved to adjust both the spreading width and pattern.

As it is better shown in FIGS. 5 and 6, each of the manure discharging pipe(s) 51 and 53 has a bottom portion 56 that is pivotable between an inwards position (see FIG. 6B) and an outwards position (see FIG. 6A). In the inwards position, the bottom portion 56 of the at least one manure discharging pipes 51 and 53 extends adjacently to the manure tank. In the outwards position, pipes 51 and 53 extend away from the manure tank for spreading manure at a predetermined distance on each side of the tank.

As aforementioned, the liquid manure spreading tool bar for use in a manure spreader as shown in the drawings comprises three manure discharging pipes 51 to 53. Depending on their number, the discharging pipes could be arranged in different configurations. In the illustrated embodiment, one of three manure discharging pipes, namely the one numbered 52, is positioned centrally between the supporting frame 20 and the tank 10. Preferably, this central discharging pipe 52 is used to spread manure directly under the manure distributor 30. The two other manure discharging pipes 51 and 53 are positioned laterally opposite to one another. These two other manure discharging pipes are actually positioned to spread manure on each side of the liquid manure spreader tank which are not being serviced by the central manure discharging pipe 52.

In the preferred embodiment shown in the drawings, each manure discharging pipe advantageously has an outlet 55 to which deflector 60 is connected (see FIG. 3). This deflector 60 is used for deflecting manure over the ground. It is worth mentioning that this deflector 60 has an adjustable sizing outlet which allows for different consistencies of manure to be deflected onto the ground at a required width.

In use, the manure pump 15 of the manure spreader supplies a volume of manure to the manure distributor 30 via the vertically extending telescopic conduit 40. Once the manure enters the manure distributor, it is then distributed to the manure discharging pipes 51 to 53. In the manure discharging pipes, the manure first flows into the portion 58 of the discharging pipes projecting upwardly, and then flows a downwardly direction for the remaining portion of the discharge pipe down to the outlet 55 where the manure is deflected onto the ground by making use of a deflector 60 which has adjustable sizing outlets. In all cases, such a flow will be achieved without any blockage whatever be the position of the manure distributor and the discharging pipes, since in all cases, even when the pump is stopped, the remaining volume of manure left in the pipes would always have the possibility to flow out of the discharging pipes, and such is done by gravity.

If needed, the amount of volume supplied to the manure distributor can be regulated by an adjustable manure flow regulator (not shown). An example of such a flow regulator is described in U.S. Pat. No. 5,435,493.

Of course, numerous modifications could be made to the above-described embodiment of the invention without departing from the scope of the same as defined in the appended claims.

The invention claimed is:

1. A liquid manure spreading tool bar for use on a manure spreader comprising:
   a tank for transporting manure; and
   a manure pump having an inlet located within the tank and an outlet located outside said tank to supply the manure stored in the tank to said manure spreading tool bar;
   wherein said manure spreading tool bar comprises:
   a supporting frame externally mounted onto the tank in such a manner as to be movable up and down with respect to said tank;
   means for vertically moving the supporting frame up and down between a low position and a high position relative to the tank;
   a liquid manure distributor mounted onto the supporting frame, said distributor having an inlet for receiving manure and at least one outlet;
   a vertically extending telescopic conduit made of a rigid material, said telescopic conduit having one end connected to the outlet of the pump and another end connected to the inlet of the distributor so as to feed the manure pumped from the tank to the distributor whatever be the vertical position of the frame relative to the tank; and optionally
   a manure discharging pipe connected to each of said at least one outlet of the distributor, each of said at least one discharging pipe being made of a rigid material and being vertically movable up and down together with said frame and said distributor.

2. The liquid manure spreading tool bar according to claim 1, wherein each of said at least one manure discharging pipe is connected onto said supporting frame.

3. The liquid manure spreading tool bar according to claim 2, wherein each of said at least one manure discharging pipe comprises an outlet to which a deflector for deflecting manure over the ground is connected thereto, said deflector being interchangeable and comprises an adjustable sizing outlet.

4. The liquid manure spreading tool bar according to claim 1, wherein one or more of said at least one manure discharging pipe comprises a bottom portion that is pivotable between an inwardly position where said bottom portion extends adjacently to the manure tank, and an outwards position where said portion extends away from the manure tank for spreading manure at a predetermined distance.

5. The liquid manure spreading tool bar according to claim 1, wherein the end of the vertically extending telescopic conduit connected to the inlet of the manure distributor is at the top of said telescopic conduit, and the other end of said telescopic conduit connected to the outlet of the pump is at the bottom of said telescopic conduit.

6. The liquid manure spreading tool bar according to claim 5, wherein each of said at least one manure discharging pipe comprises a portion projecting upwardly on top of said manure distributor and a remaining portion extending downwardly without any horizontal sections so as to avoid any blockages.

7. The liquid manure spreading tool bar according to claim 1, comprising three of said at least one manure discharging pipe, one of said at least three manure discharging pipes being positioned centrally between said supporting frame and said tank and the two other manure discharging pipes being positioned laterally opposite to one another on opposite sides of the tank.

8. The liquid manure spreading tool bar according to claim 1, wherein said means for vertically moving the supporting frame up and down between a low position and a high position relative to the tank is a hydraulic system.

9. The liquid manure spreading tool bar according to claim 1, wherein each of said at least one discharging pipe is provided with an upwardly projecting air vent.

10. The liquid manure spreading tool bar according to claim 2, wherein:
  one or more of said at least one manure discharging pipe comprises a bottom portion that is pivotable between an inwardly position where said bottom portion extends adjacently to the manure tank, and an outwards position where said portion extends away from the manure tank for spreading manure at a predetermined distance; and
  the end of the vertically extending telescopic conduit connected to the inlet of the manure distributor is at the top of said telescopic conduit, and the other end of said telescopic conduit connected to the outlet of the pump is at the bottom of said telescopic conduit.

11. The liquid manure spreading tool bar according to claim 10, wherein:
  each of said at least one manure discharging pipe comprises a portion projecting upwardly on top of said manure distributor and a remaining portion extending downwardly without any horizontal sections so as to avoid any blockages; and
  each of said at least one discharging pipe is provided with an upwardly projecting air vent.

* * * * *